(12) United States Patent
Hartman

(10) Patent No.: US 6,798,528 B1
(45) Date of Patent: Sep. 28, 2004

(54) SYSTEM AND METHOD FOR MEASURING THE DIMENSIONS OF MOVING PACKAGES

(76) Inventor: Richard L. Hartman, 1103 Deborah Dr., Huntsville, AL (US) 35801

(*) Notice: Subject to any disclaimer, the term of this patent is extended or adjusted under 35 U.S.C. 154(b) by 120 days.

(21) Appl. No.: 09/957,172

(22) Filed: Sep. 20, 2001

Related U.S. Application Data

(60) Provisional application No. 60/234,026, filed on Sep. 20, 2000.

(51) Int. Cl.$^7$ .............................................. G01B 11/02
(52) U.S. Cl. ....................... 356/625; 356/627; 356/638
(58) Field of Search ................................ 356/625, 627, 356/638

(56) References Cited

U.S. PATENT DOCUMENTS

| | | | |
|---|---|---|---|
| 3,710,922 A | * | 1/1973 | Lanphere et al. ............. 356/73 |
| 3,819,918 A | * | 6/1974 | Hale ........................... 356/627 |
| 3,997,270 A | | 12/1976 | Suzuki |
| 4,227,813 A | | 10/1980 | Pirlet et al. .................. 356/625 |
| 4,794,262 A | | 12/1988 | Sato et al. ................. 250/559.22 |
| 4,855,608 A | | 8/1989 | Peterson, II |
| 4,906,098 A | | 3/1990 | Thomas et al. .............. 356/612 |
| 4,929,843 A | | 5/1990 | Chmielewski, Jr. et al. ....................... 250/559.05 |
| 4,939,379 A | | 7/1990 | Horn et al. ................. 250/559.06 |
| 5,025,477 A | * | 6/1991 | Baitz et al. ................... 382/100 |
| 5,193,120 A | | 3/1993 | Gamache et al. ............ 382/286 |
| 5,359,418 A | * | 10/1994 | Zaleski ........................ 356/640 |
| 5,416,591 A | | 5/1995 | Yoshimura et al. .......... 356/608 |
| 5,661,561 A | | 8/1997 | Wurz et al. .................. 356/635 |
| 5,719,678 A | * | 2/1998 | Reynolds et al. ............ 356/627 |
| 5,991,041 A | | 11/1999 | Woodworth |
| 6,603,563 B1 | * | 8/2003 | Gagliano ..................... 356/601 |

OTHER PUBLICATIONS

Scientific Technologies, Inc., *VS500 Vehicle Scanner*, Internet Brochure, www.stiscanners.com.
Smith, Warren J., *Practical Optical System Layout*, McGraw–Hill, New York, NY 1997, pp 39, 40, 42.
Melles, Griot, Catalog, *The Practical Application Of Light*, 1999, pp 10.4 and 10.11.
Goldstein, Herbert, *Classical Mechanics*, Addison–Wesley Publishing Company, Rading MA 1959, pp 107–109.
Sick, Inc., Product Information Brochure for Laser Measurement System LMS 200.

* cited by examiner

Primary Examiner—Zandra Smith
Assistant Examiner—Kara Geisel
(74) Attorney, Agent, or Firm—Waddey & Patterson, PC; Larry W. Brantley; Mark J. Patterson

(57) ABSTRACT

A system and method for measuring the dimensions of moving packages includes a computer system connected to a position tracking system and a slice measurement system. The computer system uses the position tracking system to generate a series of position measurements of the packages as they move through the slice measurement system and uses the slice measurement system to generate a cross sectional slice of the packages at each measured positioned. The computer system then uses the cross sectional slice information to determine the height and width of the packages and uses the position measurements to determine the length of the packages.

6 Claims, 14 Drawing Sheets

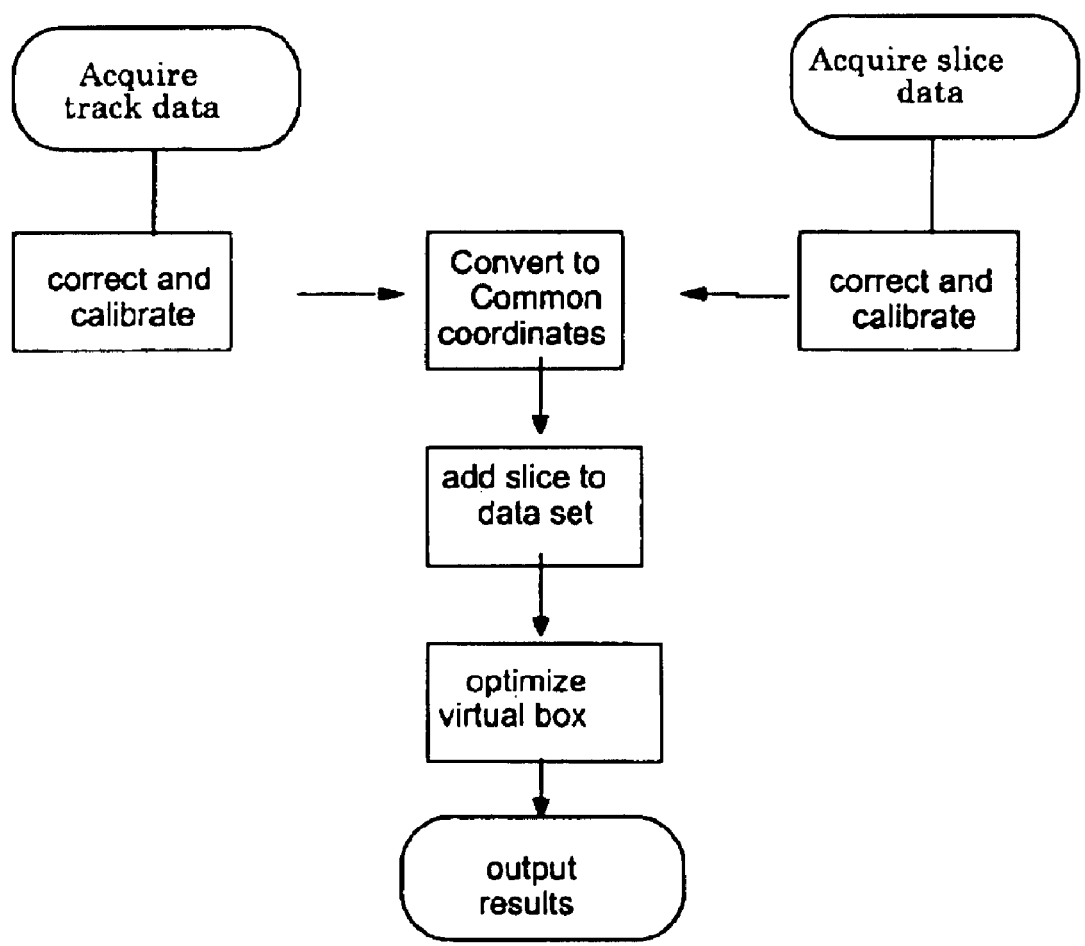
FIG. 14 Algorithm Overview

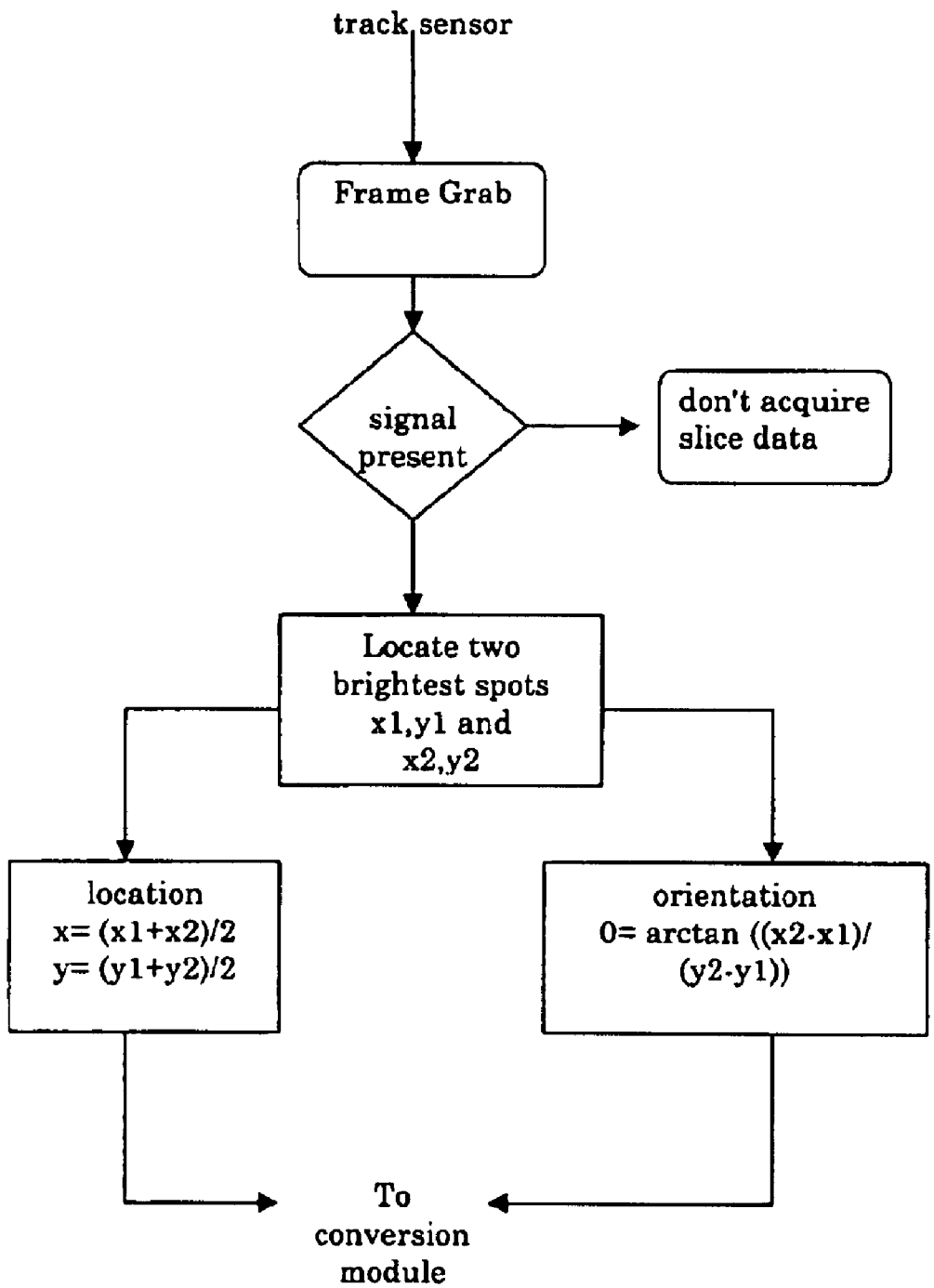
Fig. 15 Acquire Track Data

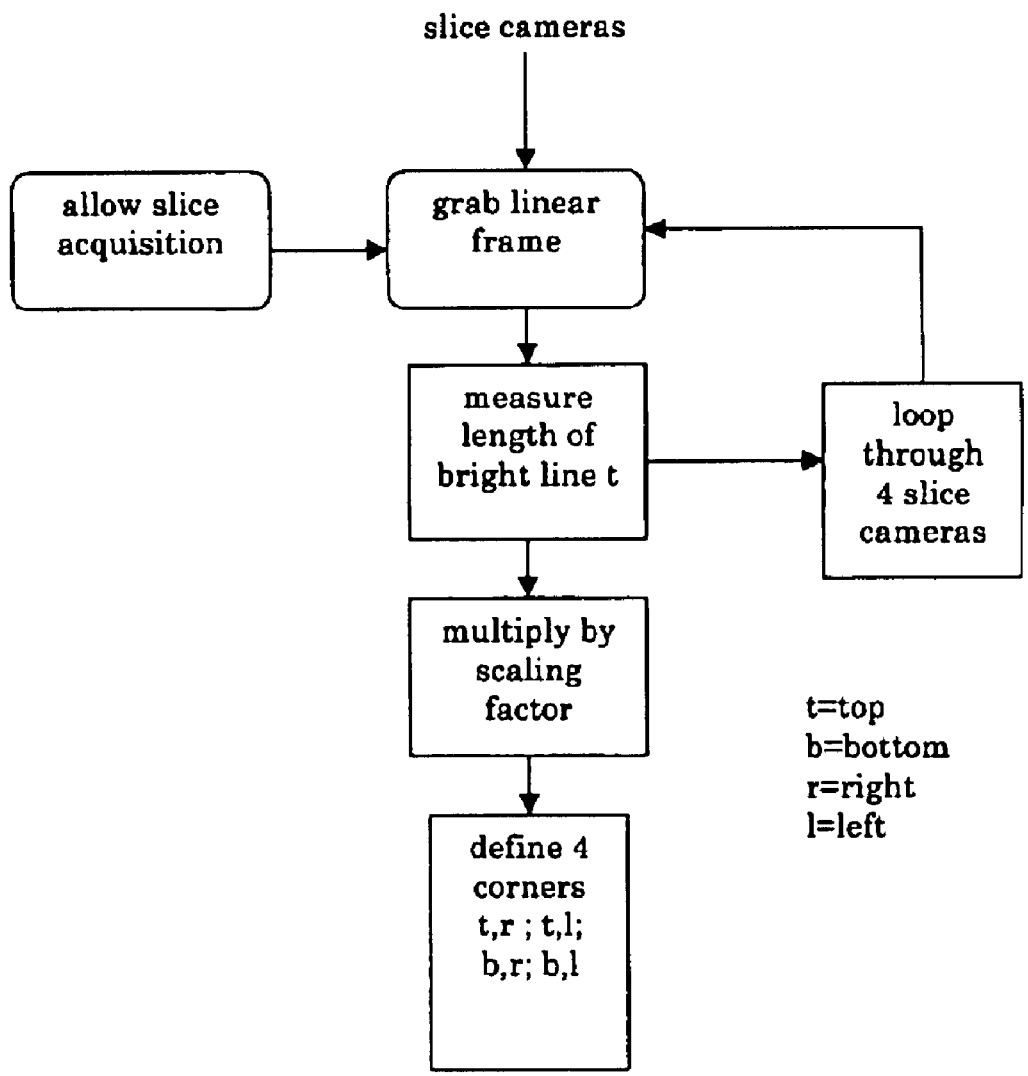
FIG. 16 Acquired Slice Data

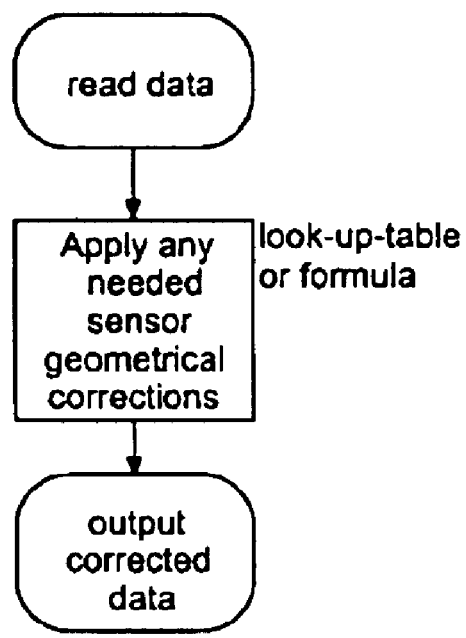
Fig. 17 Correcting and calibration algorithm
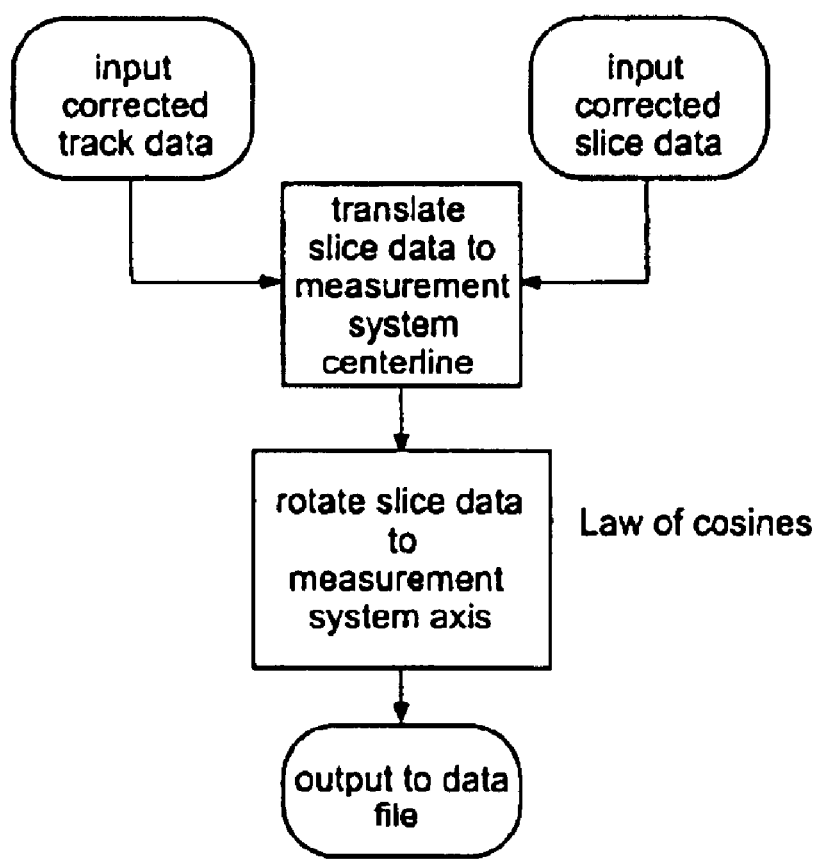
Fig. 18 Algorithm for converting to common coordinates

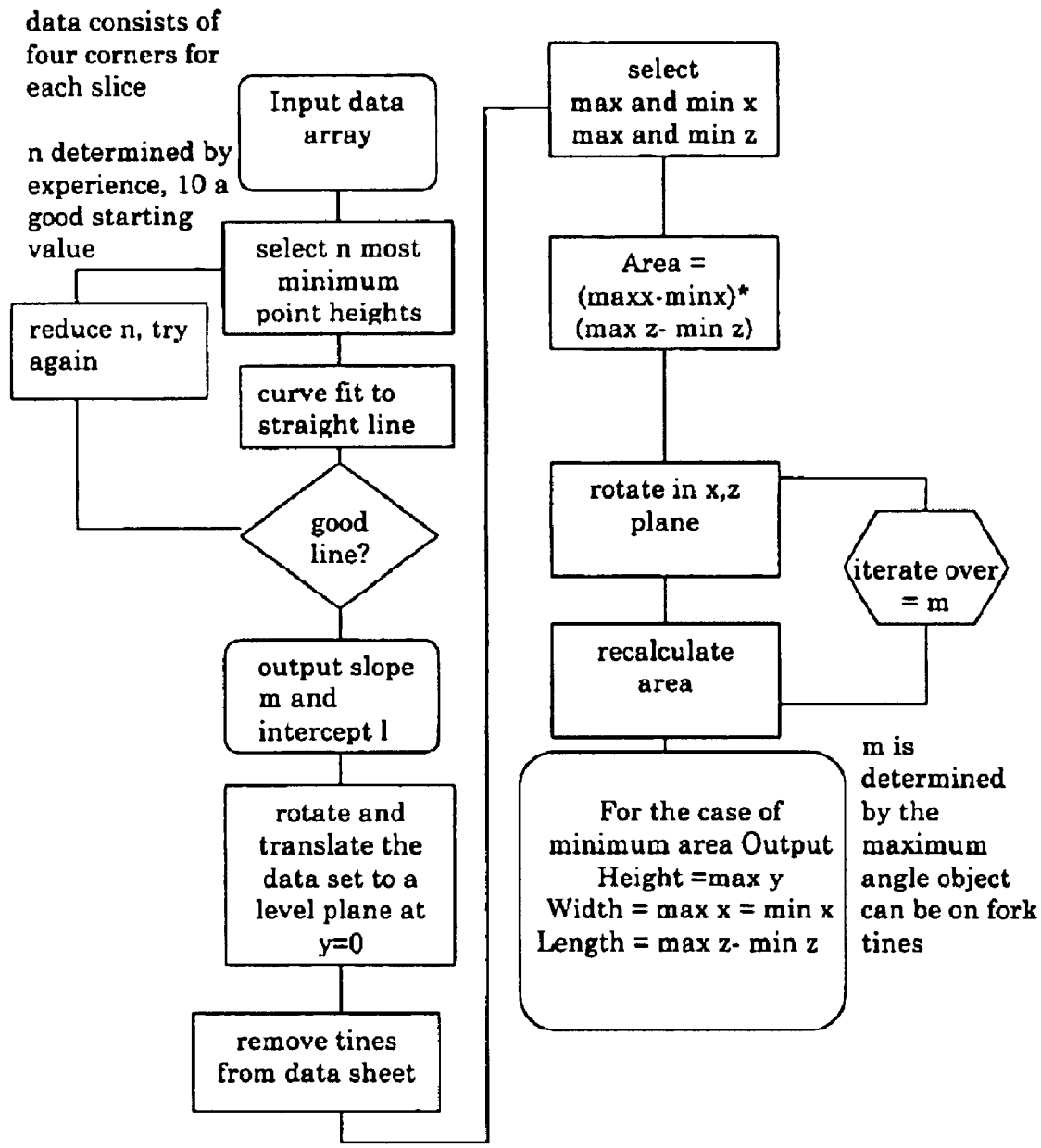
FIG. 19 Algorithm to fit virtual box

US 6,798,528 B1

SYSTEM AND METHOD FOR MEASURING THE DIMENSIONS OF MOVING PACKAGES

This application claims benefit of co-pending U.S. Patent application U.S. Ser. No. 60/234,026 filed Sep. 20, 2000, entitled "Dimensioning System For Moving Objects" which is hereby incorporated by reference.

Be it known that I, Richard L. Hartman, a citizen of the United States, residing at 1103 Deborah Drive, Huntsville, Ala. 35801, have invented a new and useful "System And Method For Measuring The Dimensions Of Moving Packages."

BACKGROUND OF THE INVENTION

The present invention relates generally to systems and methods for measuring the dimensions of packages. More particularly, this invention pertains to a system and method for measuring the dimensions of packages being moved by material handling equipment.

Package shipping companies, such as FedEx, have a need for measuring the dimensions, i.e., the height, width, and length, of the packages they ship. This information is used for a variety of purposes, including calculating the volume occupied by the package and using this volume information to load the packages as efficiently as possible or to bill customers by volume rather than weight.

More importantly, these companies have a need to measure the dimensions of these packages as quickly as possible. This is true because, in many cases, packages being shipped must arrive at a destination within a specific amount of time. As a result, the amount of time available for use in measuring the dimensions of packages is limited in these situations. One possible solution to these problems, as taught by the present invention, is to measure the dimensions of packages as they are moved around by material handling equipment, i.e., a forklift or some other type of similar equipment.

None of the prior art systems known in the art, however, teach a system for measuring packages as they are moved around by material handling equipment. For example, U.S. Pat. No. 5,661,561, issued to Wurz et al. on Aug. 26, 1997 and entitled "Dimensioning System," and U.S. Pat. No. 4,929,843, issued to Chmielewski, Jr. et al. on May 29, 1990 and entitled "Apparatus and Method for Determining a Dimension of an Object," both teach systems for measuring the dimensions of a package being moved by a moving conveyor. U.S. Pat. No. 5,416,591, issued to Yoshimura et al. on May 16, 1995 and entitled "Method of Determination of a Three-Dimensional Profile of an Object," U.S. Pat. No. 5,193,120, issued to Gamache et al. on Mar. 9, 1993 and entitled "Machine Vision Three Dimensional Profiling System," and U.S. Pat. No. 4,939,379, issued to Horn on Jul. 3, 1990 and entitled "Contour Measurement Using Time-Based Trangulation Methods," all teach systems for measuring the dimensions of a package by scanning the package with a beam of light while the package is stationary.

What is needed, then, is a system and method for measuring the dimensions of packages being moved by material handling equipment.

SUMMARY OF THE INVENTION

Accordingly, one object of the present invention is to provide a system and method for measuring the dimensions of packages being moved by material handling equipment.

Another object is to provide a system and method for measuring the dimensions of packages having a wide range of shapes and sizes.

Still another object is to provide a system and method for measuring packages being moved by material handling equipment at different heights relative to the material handling equipment.

These and other objects, which will become apparent to someone practicing the present invention, are satisfied by a system and method for measuring the dimensions of packages that includes a computer system connected to a position tracking system and a slice measurement system. The computer system uses the position tracking system to generate a series of position measurements of the packages as they move through the slice measurement system and uses the slice measurement system to generate a cross sectional slice of the packages at each measured positioned. The computer system then uses the cross sectional slice information to determine the height and width of the packages and uses the position measurements to determine the length of the packages.

BRIEF DESCRIPTION OF THE DRAWINGS

FIG. 14 is a flowchart showing an overview of the steps performed by the computer system of the present invention.

FIG. 15 is a flowchart showing the steps performed by the computer system to calculate position and orientation of packages.

FIG. 16 is a flowchart showing the steps performed by the computer system to generate cross sectional slices of the packages.

FIG. 17 is a flowchart showing the conversion of the data set for geometrical corrections.

FIG. 18 is a flowchart showing a typical algorithm for translating each slice into a common frame of reference by equations of translation and the Euler equations of rotation.

FIG. 19 is a flowchart showing the steps for calculating a parallelpiped based on the measured dimensions of the packages.

DESCRIPTION OF THE PREFERRED EMBODIMENTS

Figure 1:
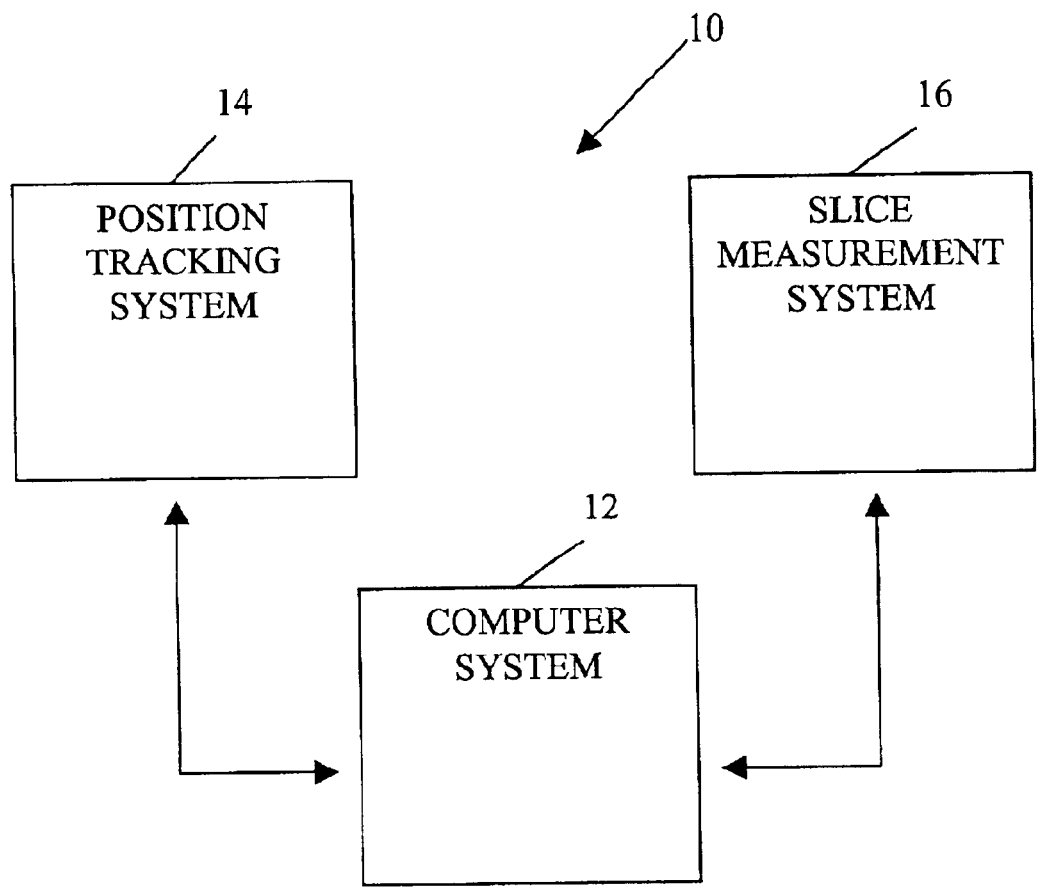
FIG. 1 is a block diagram of one embodiment of the present invention.
Figure 2:
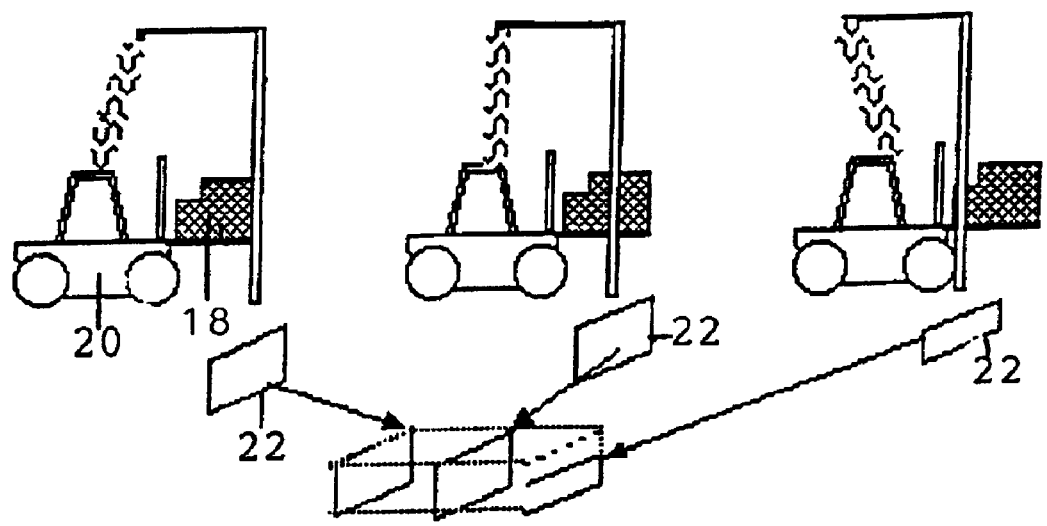
FIG. 2 is a side view of one embodiment of the present invention showing a forklift moving packages through the system.

Referring to FIGS. 1 and 2, one embodiment of the present invention of a system 10 for measuring the dimensions of moving packages includes a computer system 12 connected to a position tracking system 14 and a slice measurement system 16. The computer system 12 uses the position tracking system 14 to detect the arrival and to measure the position and orientation of packages 18 as they are moved through the slice measurement system 16 using material handling equipment 20, i.e., a forklift, and uses the slice measurement system 16 to measure cross sectional slices 22 of the packages 18 as they pass through the slice measurement system 16.

The number of position measurements and corresponding cross sectional slices required to accurately determine the dimensions of the packages 18 is dependent upon the speed at which the packages 18 are passing through the slice measurement system 16. If the packages are moving at a slow speed and the packages form a relatively uniform shape, then a smaller number of position measurements is required. On the other hand, if the packages are moving very rapidly and the packages are not relatively uniformly shaped, then a larger number of position measurements are required.

The number of position measurements is also dependent upon the required accuracy of the measurements of the dimensions and the size of the packages 18. For example, if the dimensions of the packages must be measured to within ¼ inch, then the cross sectional slices must be taken every ¼ inch along the length of the packages 18. If, on the other hand, the required accuracy is ½ inch, the cross sectional slice can be measured every ½ inch.

Figure 3:
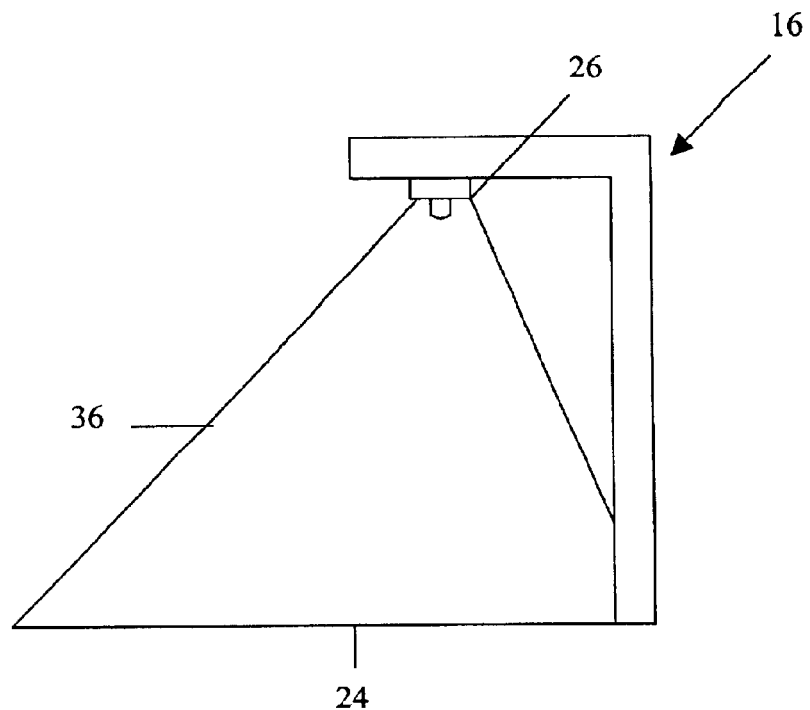
FIG. 3 is a side view of one embodiment of the beacon system and slice measurement system of the present invention.
Figure 4:
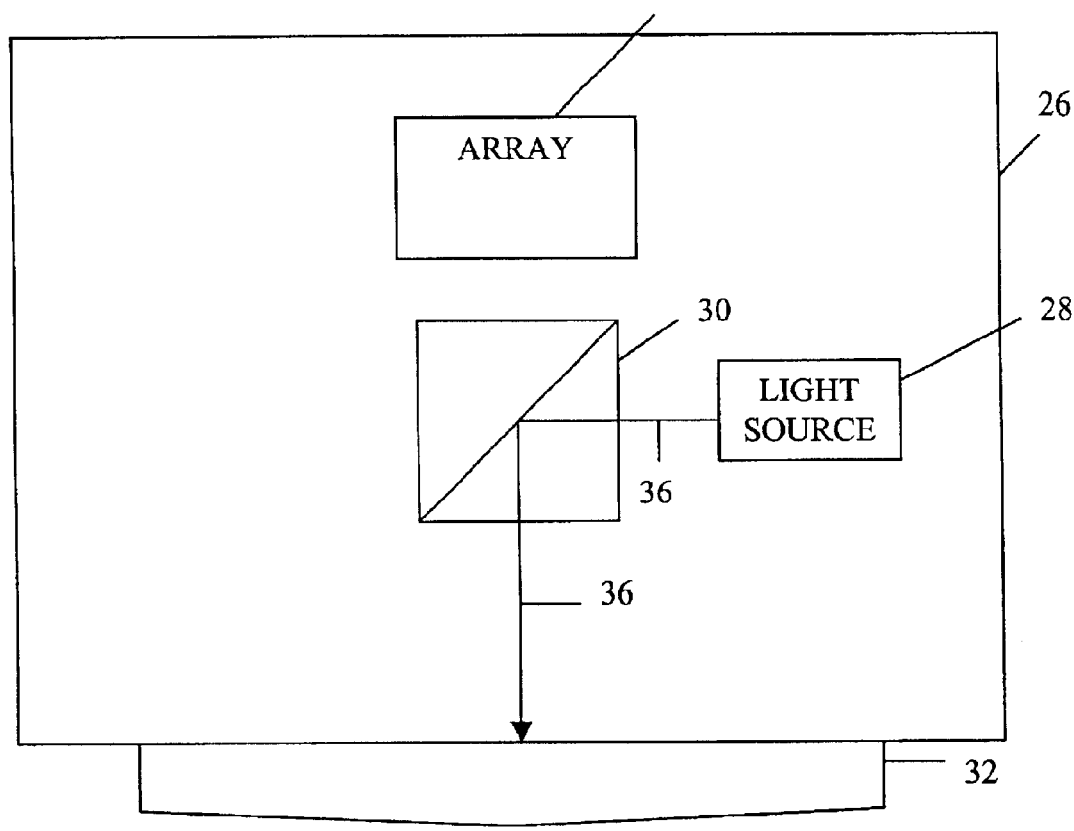
FIG. 4 is an enlarged side view of the beacon system shown in FIG. 3.

Referring to FIGS. 3 and 4, the computer system 12 detects the arrival and measures the position and orientation of the packages 18 by illuminating an area 24 in front of the slice measurement system 16 and measure light reflected off of the material handling unit 18 as it passes through this area using the position tracking system 14. To illuminate area 24 and to measure reflected light, the position tracking system 14 includes a beacon system 26 that includes a light source 28, a beam splitter 30, a lens 32, and a position detector 34. The light source 28 generates a beam of light 36 that is reflected by the beam splitter 30 toward the lens 32, the lens 32 spreads the beam of light 36 so that it covers area 24, and the position detector 34 records any light reflected back through lens 32. In one embodiment, the light source 28 is a conventional infrared LED and the detector 34 is a conventional rectangular array. In alternative embodiments, the detector 34 can be a convention video camera, such as a CMOS PC-51 video camera, or some other type of recording device.

Figure 5:
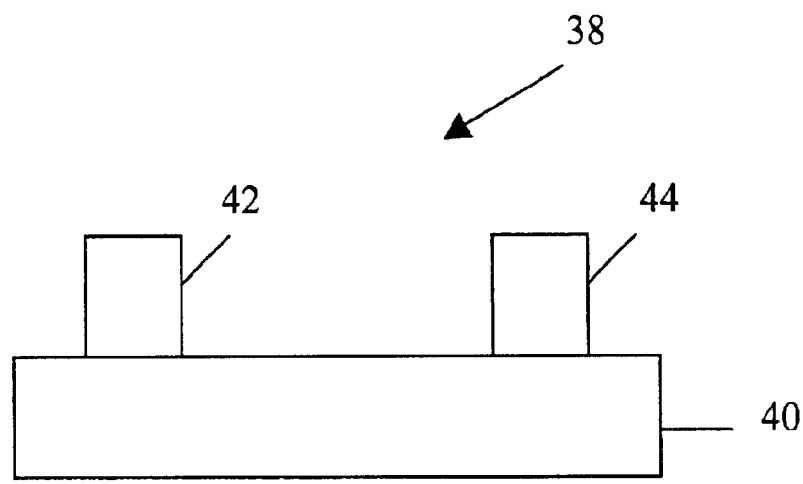
FIG. 5 is a side view of one embodiment of the reflector system of the present invention.
Figure 6:
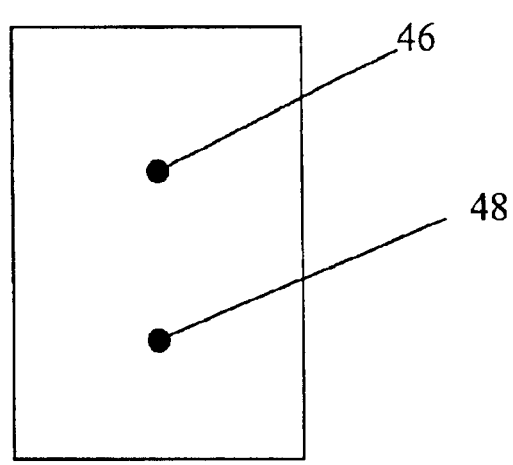
FIG. 6 is the output of the position-tracking detector of the present invention when the material handling unit enters the slice measurement system travelling in a direction perpendicular to the slice measurement system.

Referring to FIG. 5, to reflect the beam of light 36 emitted by the beacon system 26, the position tracking system 14 includes a reflector system 38 that includes a mounting plate 40 and two retroreflectors, 42 and 44, separated by a known distance. The mounting plate 40 is used to connect the reflector system 38 to material handling unit 20, and retroreflectors, 42 and 44, which are known in the art, are used to reflect light striking the reflectors back toward the source of the light. Because the retroreflectors, 42 and 44, have a highly selective return, the image recorded by the detector 34 includes two spots of light, 46 and 48 (see FIG. 6), one from each retroreflector. The location of these spots on the detector 34 is proportional to the position of the material handling unit 20, and indirectly a measure of the position of the packages 18, with respect to the slice measurement system 16 and is used by the computer system 12 to calculate the position of the packages 18 as they move through the slice measurement system 16.

The computer system 12 also uses the location of the spots on the detector 34 to calculate the orientation of the material handling unit 20, which is also an indirect measurement of the orientation of the packages 18, as well. The system 10 is designed to receive packages 18 that are traveling in a direction that is perpendicular to the slice measurement system 16. If the material handling unit 20 is not traveling in a direction that is perpendicular to the slice measurement system 16, the computer system 12 must compensate for this difference in order to accurately calculate the dimensions of the packages 18.

Figure 7:
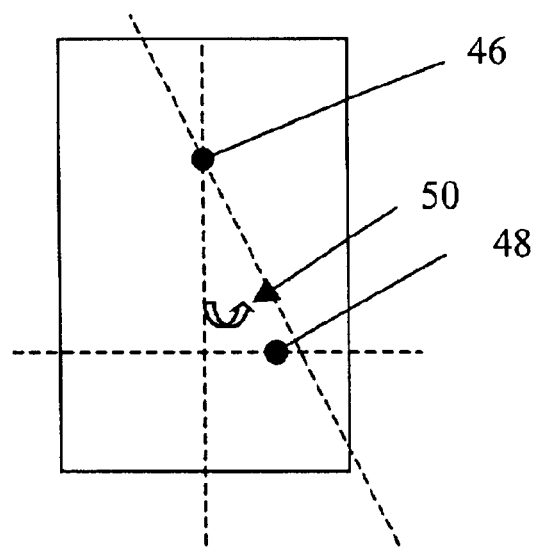
FIG. 7 is an image output by the position-tracking detector of the present invention when the material handling unit enters the slice measurement system travelling in a direction that is not perpendicular to the slice measurement system.

To compensate, the computer system 12 calculates an angle 50 formed by the two spots, 46 and 48, on the detector 34 (see FIG. 7). The angle 50 is a measure of the orientation of the material handling unit 20, and indirectly the packages 18, with respect to the slice measurement system 16 and is used by the computer system 12, along with conventional coordinate transformation equations, to compensate for this difference. One technique for transforming coordinate systems used with the present invention is described in Herbert Goldstein's book entitled "Classical Mechanics," published in 1959 and hereby incorporated by reference.

In a similar manner, if the material handling unit 20 enters the slice measurement system 16 with one orientation and changes orientation while passing through the slice measurement system 16, the computer system 12 must compensate for these changes with regard to each cross-sectional slice of the packages 18. In other words, the slice measurement system 16 will generate one cross-sectional slice when the material handling unit has one orientation and another cross-sectional slice when the material handling unit 20 has a different orientation, and the computer system 12 must compensate for this change in order to accurately combine the slices to calculate the height and width of the packages 18.

In alternative embodiments where the material handling unit 20 can only enter the slice measurement system 16 travelling in a direction perpendicular to the slice measurement system 16, the reflector system 38 can be reduced to a single retroreflector and the mounting plate 40 and the computer system 12 does not perform this compensation step. In addition, in other alternative embodiments, the reflector system 38 may be replaced with some sort of active beacon (not shown). In this case, the beacon system 26 would include the lens 32 and detector 34, and would be designed to record light emitted by the active beacon.

Figure 8:
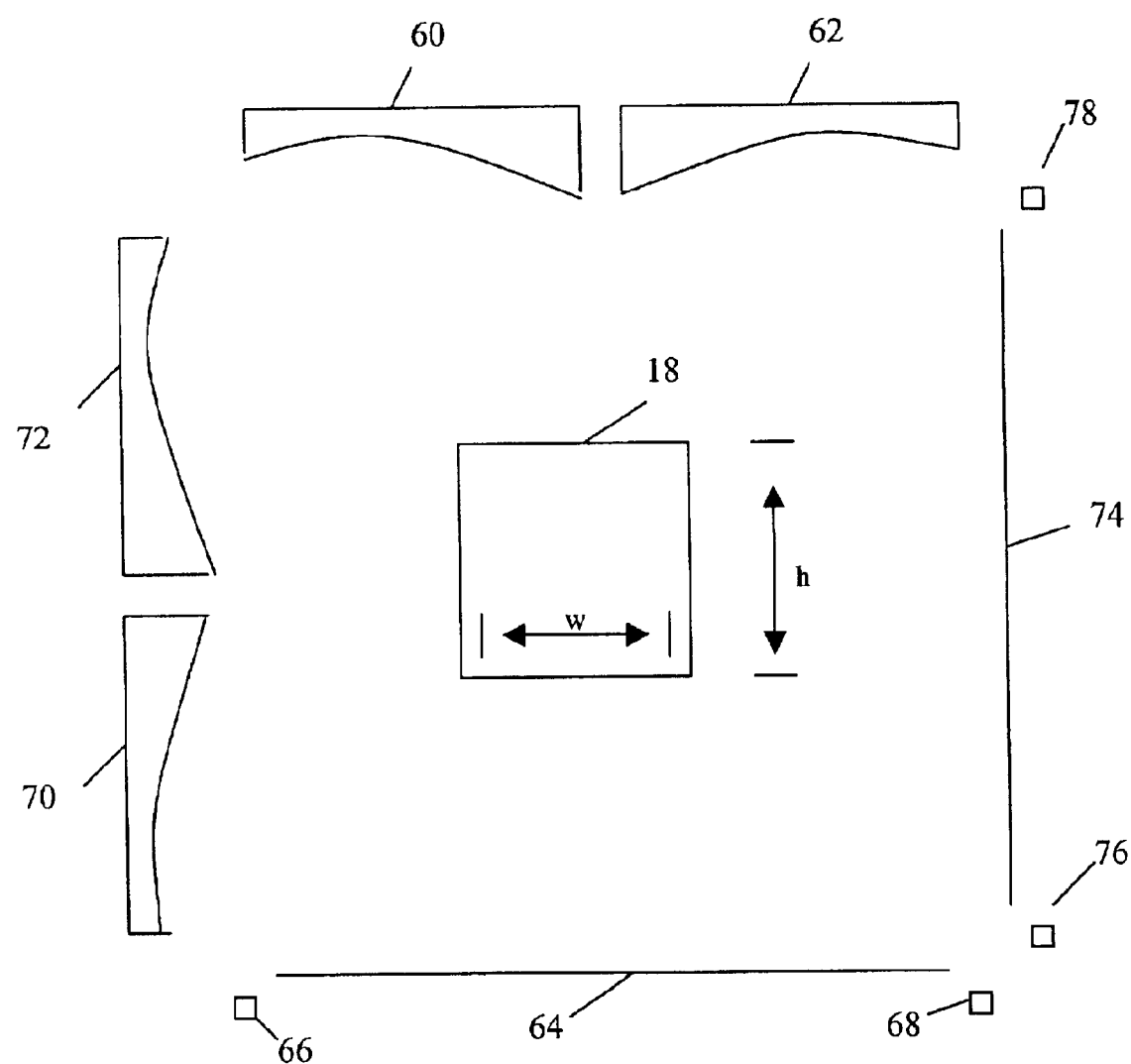
FIG. 8 is a side view of one embodiment of the slice measurement system of the present invention.

Referring to FIG. 8, the slice measurement system 16 includes a frame 51, a horizontal measurement system 52, and a vertical measurement system 54. The measurements systems, 52 and 54, are identical and are used to measure the width 56 and height 58 of the packages 18, respectively. More specifically, the horizontal measurement system 52 is used by the computer system 12 to measure the width 56 of the packages 18 and includes two parabolic mirrors, 60 and 62, a light source 64, and two slice detectors, 66 and 68. In a similar manner, the vertical measurement system 54 is used by the computer system 12 to measure the height 58 of the packages 18 and also includes two parabolic mirrors, 70 and 72, a light source 74, and two slice detectors, 76 and 78. In one embodiment, the light sources, 64 and 74, are side emitting fiber optic filaments known in the art, with light source 74 embedded in the frame 51 and light source 64 embedded in the ground under the frame 51.

The computer system 12 also uses the cross-sectional slices to compensate for tilt in the material handling unit 20. The system 10 is designed to receive packages that are level with the ground, i.e., the bottom of the packages is parallel with the ground. If the material handling unit 20 is tilted up or down, the computer system 12 must compensate for this difference in order to accurately calculate the dimensions of the packages 18.

To compensate, the computer system 12 measures the height of the packages 18 using one cross sectional slice and measures the height of the packages 18 using a second cross-sectional slice. If the measured heights are the same, then the computer system 12 determines that there is no tilt. If the heights are different, the computer system 12 determines that there is tilt and, using the same conventional coordinate transformation equations referenced previously, compensates for the tilt.

The computer system 12 is further used to exclude any measurements of the forklift tines of the material handling unit 20. This is done by rejecting any cross sectional slice that has a height dimension equal to the thickness of the forklift tines or a width dimension equal to the width of the forklift tines. In one embodiment, the location of the forklift tines is detected by knowing the location of the forklift, knowing the height and tilt of the forklift tines from the bottom measurement, and knowing the width between the forklift tines from the top measurement.

The computer system 12 measures the width and height of the packages 18 by using the slice detectors, 60, 62, 66, and 68, to record shadowed images, i.e., images that include a brightly lit portion and a shadowed portion. The amount of each image that is shadowed is a measure of the width 56 and height 58 of the packages 18.

To generate the shadowed image, the light sources generate and direct a beam of light 80 toward the packages 18 and the mirrors, 60, 62, 70, and 72. A portion of the light 66 is blocked by the packages 18, casting a shadow on portions of the mirrors, 60, 62, 70, and 72, and the rest of the light 66 is reflected by the mirrors, 60, 62, 70, and 72, back to the slice detectors, 66, 68, 76, and 78, which record shadowed images.

Figure 9:
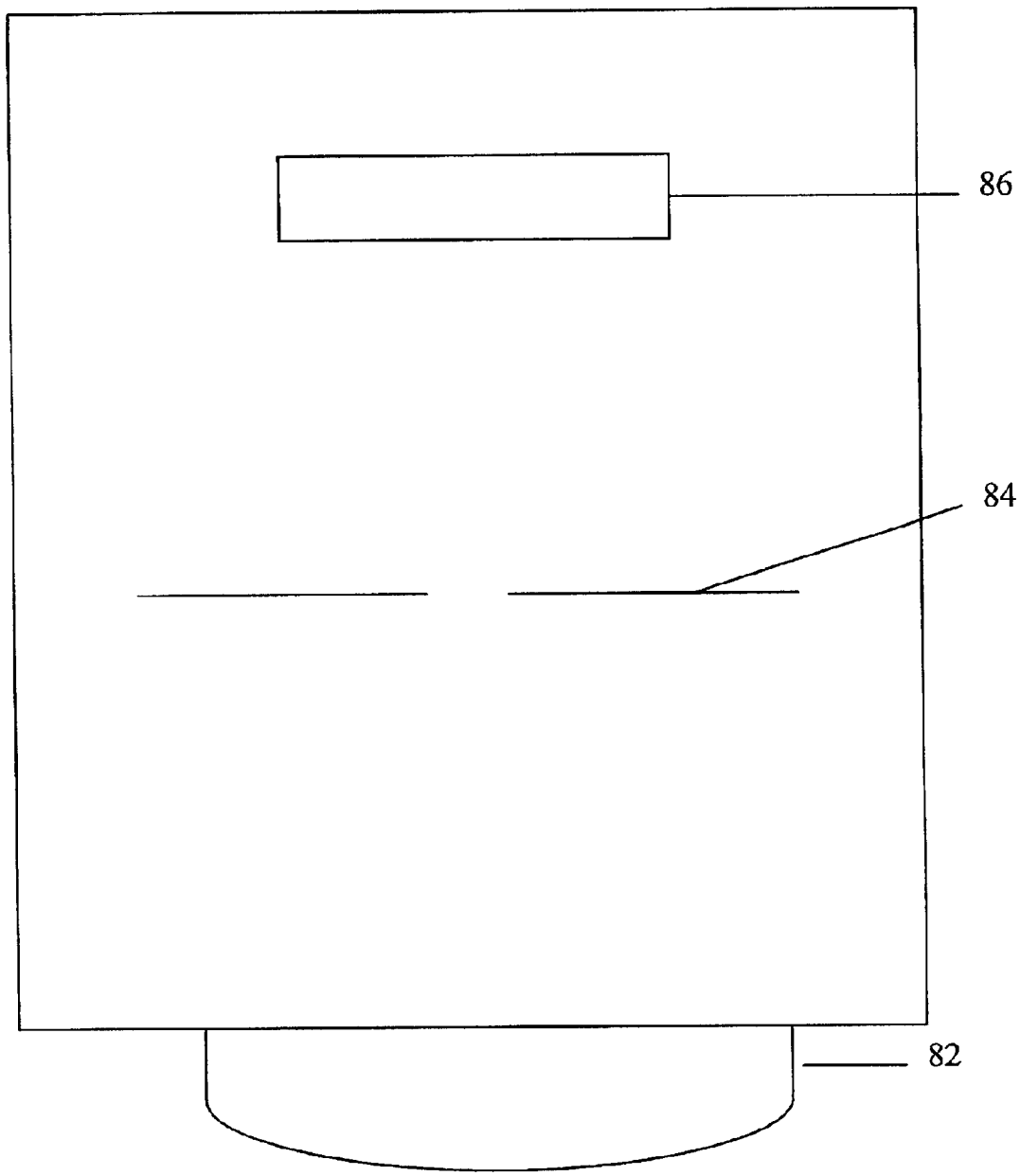
FIG. 9 is a side view of one embodiment of a slice detector used in the present invention.

Referring to FIG. 9, the slice detectors, 66, 68, 76, and 78 each include a cylindrical lens 82, a slit 84, and a detector array 86. Light 66 reflected by the parabolic mirrors, 60, 62, 70, and 72, is directed by the lenses 82 through the slits 84 and onto the detector arrays 86. For the slice detectors, 66 and 68, which are used to measure the height 56 of the packages 18, the slits are positioned to cause the slits to pass only reflected horizontal rays of light. In a similar manner, the slits in slice detectors, 76 and 78, which are used to measure the width of the packages 18, are arranged to pass only reflected vertical rays of light. The size of each slit is determined by the pixel size of the detector array and the distance between the slit and the detector 66. In general, each slit is sized to constrain the field of view of each detector pixel to a beam the size of the required measurement accuracy.

Although a detector array is shown in FIG. 9, a video camera may be used in place of the detector array. The use of a video camera, however, increases the amount of processing (video images contain more data than images generated by detector arrays) required by the computer system 12 and slows the system 10.

The thickness of the parabolic mirrors is dependent upon the desired accuracy of the system 10. For example, if the system 10 is designed to measure the dimensions of the packages 18 to an accuracy of a ¼ inch, the thickness of the parabolic mirrors should be no larger than a ¼ inch. If, on the other hand, the required accuracy is ½ inch, the thickness of the parabolic mirrors can be no larger than ½ inch. In one embodiment designed to have an accuracy of ¼ inch, the thickness of the parabolic mirrors is ¼ inch.

The size of the parabolic mirrors is dependent upon the maximum size of the packages 18 to be measured by the system 10. For example, if the maximum height and width of the packages 18 to be measured is 10 feet, the parabolic mirrors must be 10 feet long. If the maximum height and width is less than 10 feet, the parabolic mirrors may be shorter than 10 feet. In one embodiment designed to measure packages as large as 12 feet, the parabolic mirrors are all 6 feet long. Because two mirrors are used as shown in FIG. 8, the system 10 can measure packages having a maximum size of 12 feet.

Figure 10:
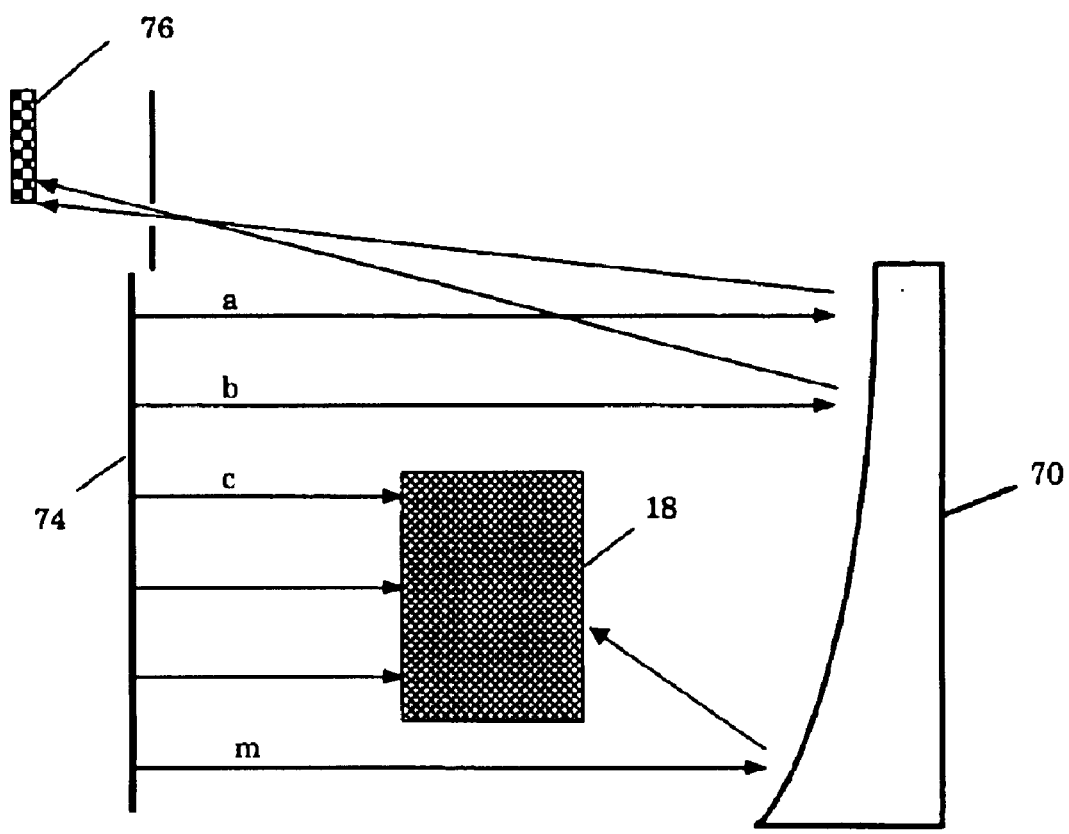
FIG. 10 is a side view of portion of the slice measurement system system shown in FIG. 8.

Two parabolic mirrors are used with the horizontal measurement system and the vertical measurement system because, in some cases, the packages 18 may block a portion of light reflected by the parabolic mirrors. To illustrate this problem, consider FIG. 10, which shows light source 74, parabolic mirror 70, and slice detector 76. Light ray "a" leaves the light source 74, travels horizontally, and is reflected by 34 parabolic mirror 70. The ray then travels to slice detector 76, illuminating the bottom pixel. Ray "b" likewise illuminates another pixel. However, ray "c" is blocked by the packages 18 to be measured. The location of the edge between illuminated pixels and nonilluminated pixels is a measurement of the location of the edge of the packages 18. Ray "m" passes the bottom of the object, but after reflection by the mirror, is blocked by the object. Because ray "m" is blocked, this configuration can be used to measure the upper edge of the packages 18 but can not be used to measure the lower edge of the packages 18. Accordingly, a second parabolic mirror, as shown in FIG. 10 is needed to measure the lower edge of the packages 18.

Figure 11:
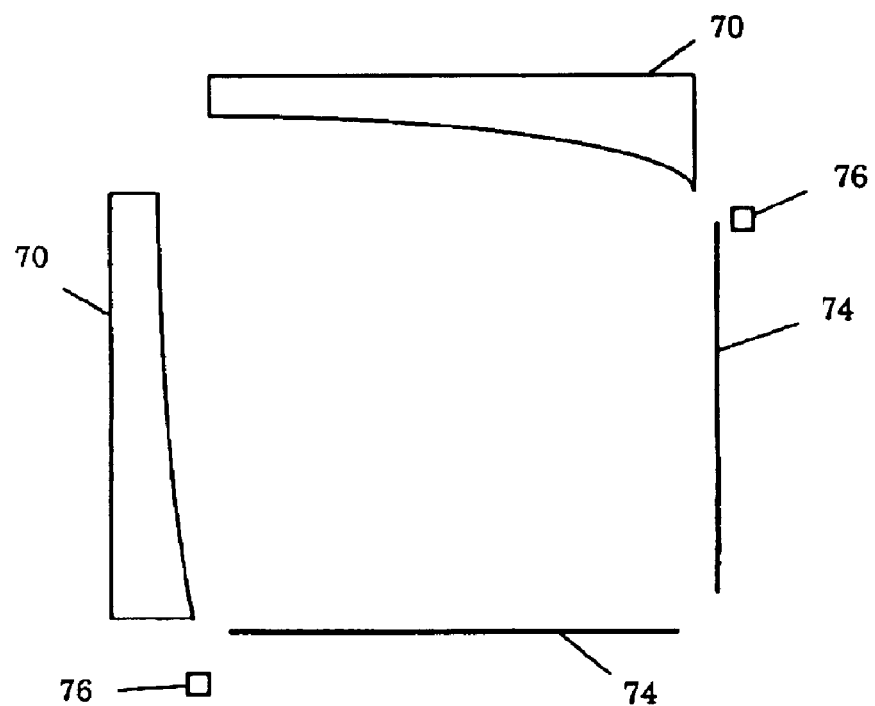
FIG. 11 is a side view of one alternative embodiment of the present invention.
Figure 12:
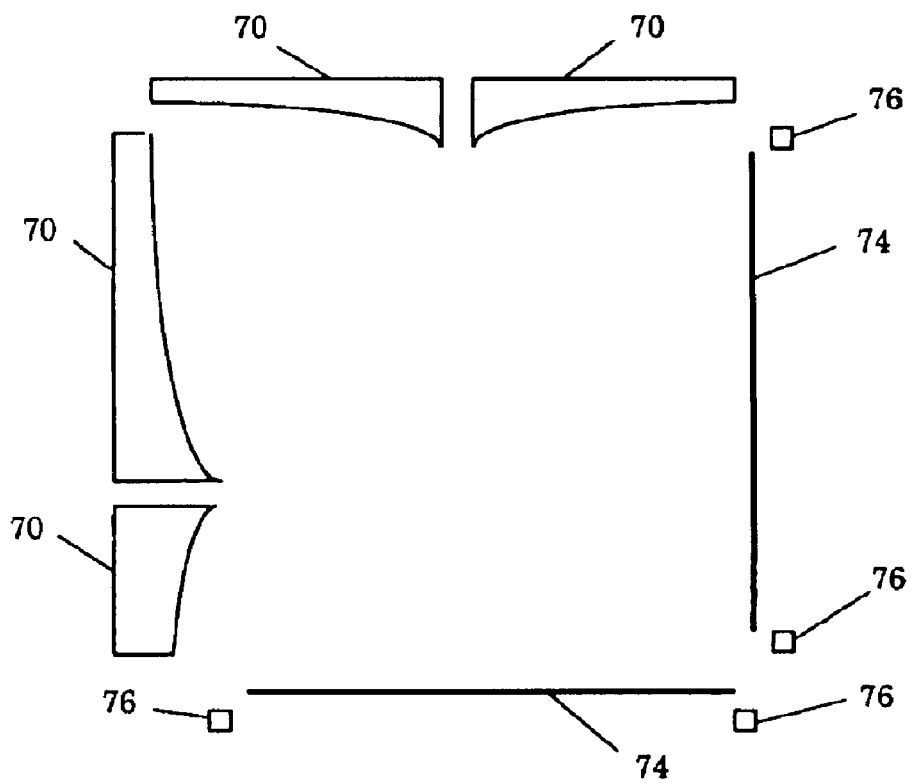
FIG. 12 is a side view of another alternative embodiment of the present invention.

Alternative embodiments of the slice measurement system 16 can have several different configurations of parabolic mirrors. For example, one alternative embodiment shown in FIG. 11 includes only two parabolic mirrors, two light sources, and two slice detectors. This type of configuration may be used when the packages 18 do not block portions of reflected light. Referring to FIG. 12, another alternative embodiment includes one large parabolic mirror and one small parabolic mirror for the vertical measurement system 54. This type of configuration may be used when the lower parabolic mirror measures a smaller portion of the packages than the upper parabolic mirror. Depending on the application, other alternative configurations may be used as well.

Figure 13:
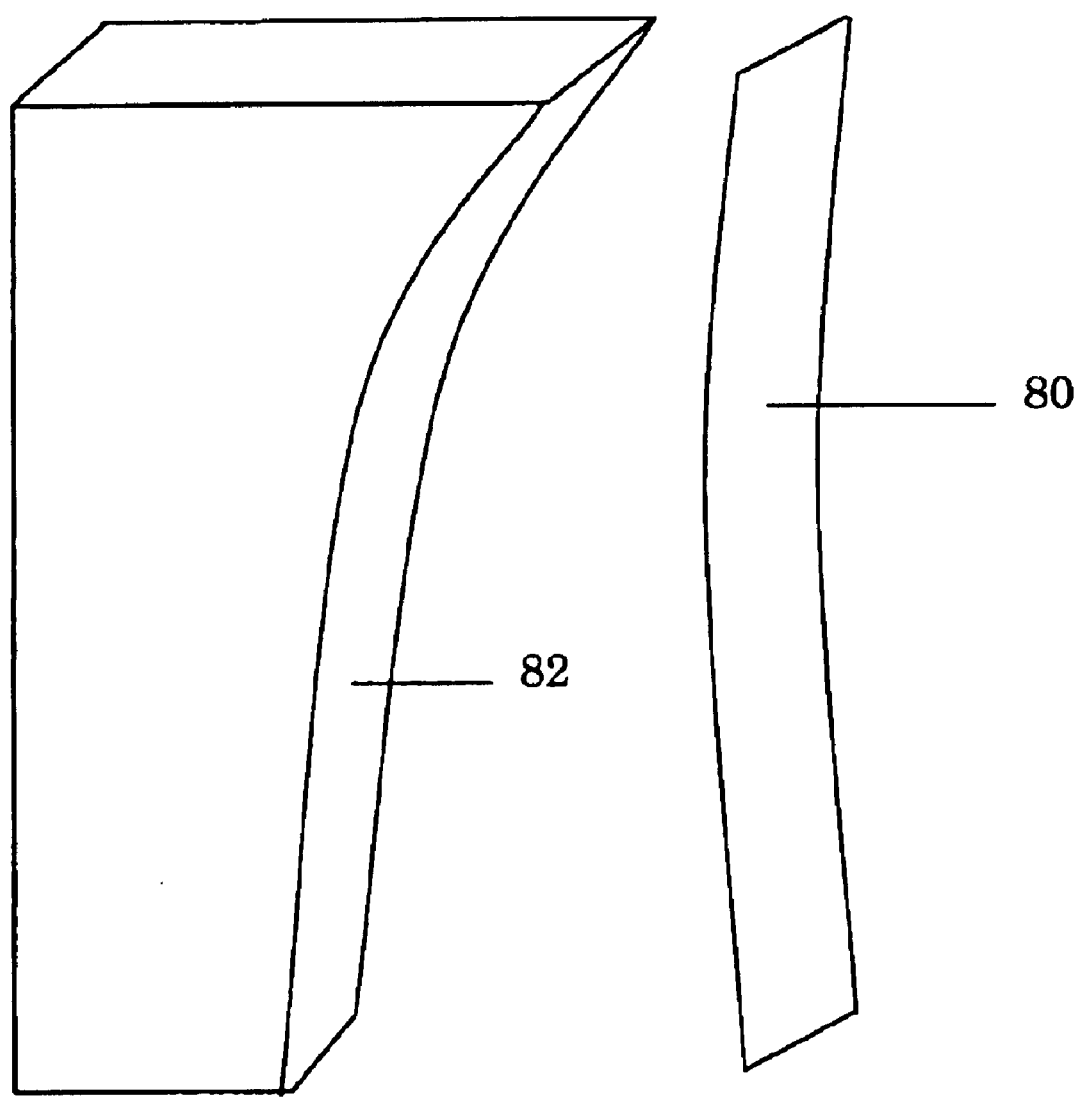
FIG. 13 is a perspective view of one embodiment of a parabolic mirror used with the present invention.

Although large conventional parabolic mirrors could be used with the present invention, these mirrors are prohibitively expensive. Accordingly, the applicant of the present invention developed a method of manufacturing an inexpensive parabolic mirror that includes a thin flexible reflector 80 bonded to a substrate 82. In one embodiment, the substrate 82 is machined out of aluminum and the reflector, which is a piece of plexiglass coated with a reflective coating, is connected to the substrate using an adhesive (see FIG. 13). In other embodiments, other types of mirrors may be used as well.

As shown in FIG. 14, the data from the position tracking system 14 and from the slice measurement system 16 are corrected and calibrated. Measurements on the various detectors need to be converted to engineering units, such as inches and feet. Depending on the dimensions of any specific instrument, data must be converted to linear coordinate systems. Then the track data of the location and orientation of the material handling equipment (MHE) is used to convert the slice data to a common coordinate system, building up the data representative of the three dimensional extremes of the object, or packages, being measured. In applications where the absolute volume is required, the virtual box which contains all the data points is optimized.

FIG. 15 is a flow chart describing steps performed by the position tracking system 14. In one embodiment, the array data of position detector 34 is acquired, for example by a frame grabber, internal digitizing, or similar methods. If there is no signal in the frame, no data is acquired. The two brightest spots indicate the location of two retroreflectors, 42 and 44. The average of the two provides the location of the MHE. The arctangent of the ratio of the difference of x and y coordinates provides the orientation. If a variety of MHE are used, such that it is possible for retroreflectors, 42 and 44, to be at different heights, the height is determined from the square root of the sum of the squares of the differences, and used to calibrate the location of the MHE in engineering units.

FIG. 16 is a flow chart describing steps performed by the slice measurement system 16. If the position-tracking algorithm above detects a reflection, a linear frame of data is acquired from each slice detector in the slice measurement system 16. The location of the transition between a bright and dark line defines the edge of the slice. After all four shadow sensors have been read, the size of the slice is determined. The measurement of left plus right is the width of the slice. The measurement of top minus bottom is the height of a slice.

FIG. 17 is a flowchart showing the conversion of the data set for geometrical corrections. FIG. 18 shows a typical algorithm for translating each slice into a common frame of reference by equations of translation and the Euler equations of rotation. The resulting set of vectors or points delimit the size of the box. In the preferred embodiment of the conversion algorithm, the rotation to account for fork tilt is performed first, moving the slices to a common "floor" based at zero height. In this case, the remaining conversion involves only two angles instead of three, and the Euler equations reduce to correction cosines.

FIG. 19 shows one approach to calculating the size of a circumscribing parallelpiped, i.e., a box that can be used to enclose the measures height, width, and length of the packages 18. In the preferred embodiment we take advantage of the fact that the bottom of the freight unit is flat. Thus the height is defined by the highest value of height. The maximum width is multiplied by the maximum length, giving a trial area. Then an additional rotation in the horizontal plane is used to determine if a different orientation of the virtual box would have a smaller area and thus a smaller volume. This process is repeated until a minimum is reached.

Thus, although there have been described particular embodiments of the present invention of a new and useful Dimensioning System For Moving Objects, it is not intended that such references be construed as limitations upon the scope of this invention except as set forth in the following claims.

What is claim is:

1. A method of measuring an object, comprising the steps of:
    illuminating the object with a first beam of light using a first light source positioned oil a first side of the object;
    reflecting portions of the first beam of light traveling past the object using a first parabolic mirror positioned on a second side of the object;
    generating, at multiple positions along the object, recordings of the portions of the first beam of light reflected by the first parabolic mirror using the first light detector positioned on the first side of the object;
    illuminating the object with a second beam of light using a second light source positioned on a third side of the object;
    reflecting portions of the second beam of light traveling past the object Using a second parabolic mirror positioned on a fourth side of the object;
    generating, at multiple positions along the object, recording of the portions of the second beam of light reflected by the second parabolic mirror using the second light detector positioned on the third side of the object;
    illuminating the object with light emitted from a third light source positioned on a fifth side of the object;
    reflecting portions of light emitted by the third light source using a reflector system indirectly connected to the object;
    generating, at multiple positions along the object, recordings of the reflected portions of the light emitted by the third light source using a third light detector positioned on the fifth side of the object, each recording of the reflected portions of light emitted by the third light source associated with one of the recordings of the reflected portions of the first beam of light and one of the recordings of the reflected portions of the second beam of light; and
    wherein the multiple recordings of the portions of the first beam of light reflected by the first parabolic mirror contain information indicative of a first dimension of the object at multiple positions along the object, the multiple recordings of the portions of the second beam of light reflected by the second parabolic mirror contains information indicative of the second dimension of the object at multiple positions along the object, and wherein the multiple recordings of the reflected portions of the light emitted by the third light source, in conjunction with the multiple recordings of reflected portions of the first and second beams of light, contain information indicative of a third dimension of the object.

2. The method of claim 1, wherein:
    the step of reflecting portions of the first beam of light includes the step of reflecting portions of the first beam of light using a first pair of parabolic mirrors positioned on the second side of the object; and
    the step of generating, at multiple positions along the object, recordings of the portions of the first beam of light reflected by the first parabolic mirror includes the step of generating, at multiple positions along the object, recordings of the portions of the first beam of light reflected by the first pair of parabolic mirrors using a first pair of light detectors positioned on the first side of the object.

3. The method of claim 2, wherein:
    the step of reflecting portions of the second beam of light includes the step of reflecting portions of the second beam of light using a second pair of parabolic mirrors positioned on the fourth side of the object;

the step of generating, at multiple positions along the object, recordings of the portions of the second beam of light reflected by the parabolic mirror includes the step of generating, at multiple positions along the object, recordings of the portions of the second beam of light reflected by the second pair of parabolic mirrors using a second pair of light detectors positioned on the first side of the object.

4. A method of measuring an object, comprising the steps of:

illuminating the object with a first beam of light using a first light source positioned on a first side of the object;

reflecting portions of the first beam of light traveling past the object using a first Parabolic mirror positioned on a second side of the object;

generating, at multiple positions along the object, recordings of the portions of the first beam of light reflected by the first parabolic mirror using a first light detector positioned on the first side of the object;

illuminating the object with a second beam of light using a second light source positioned on a third side of the object;

reflecting portions of the second beam of light traveling past the object using a second parabolic mirror positioned on a fourth side of the object;

generating, at multiple positions along the object, recordings of the portions of the second beam of light reflected by the second parabolic mirror using a second light detector positioned on the third side of the object;

illuminating the object with light from a third light source positioned on a fifth side of the object;

reflecting portions of light emitted by the third light source using a reflector system indirectly connected to the object;

generating, at multiple positions along the object, recordings of the reflected portions of the light emitted by the third light source using a third light detector positioned on the fifth side of the object; and wherein the multiple recordings of the portions of the first beam of light reflected by the first parabolic mirror contain information indicative of first dimension of the object at multiple positions along the object, the multiple recordings of the portions of the second beam of light reflected by the second parabolic mirror contain information indicative of a second dimension of the object at multiple positions along the object, and the multiple recordings of the reflected portions of the light emitted by the third light source, in conjunction with the multiple recordings of reflected portions of the first and second beams of light, contain information indicative of a third dimension of the object.

5. A system for measuring an object comprising:

a first light source positioned on a first side of the object;

a first pair of parabolic mirrors positioned on a second side of the object;

a first pair of light detectors positioned on the first side of the object;

a second light source positioned on a third side of the object;

a second parabolic mirror positioned on a fourth side of the object;

a second light detector positioned on the third side of the object;

a third light source positioned on a fifth side of the object;

a reflector system indirectly connected to the object; and a third light detector positioned on the fifth side of the object.

6. The system of claim 5, wherein the system includes a second pair of parabolic mirrors positioned on the fourth side of the object and a second pair of light detectors positioned on the third side of the object.

* * * * *